(12) United States Patent
Asai et al.

(10) Patent No.: US 9,027,364 B2
(45) Date of Patent: May 12, 2015

(54) METHOD OF MANUFACTURING GLASS SUBSTRATE

(75) Inventors: Toshiyuki Asai, Tokyo (JP); Tetsuo Suzuki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 209 days.

(21) Appl. No.: 13/183,173

(22) Filed: Jul. 14, 2011

(65) Prior Publication Data

US 2012/0006063 A1    Jan. 12, 2012

Related U.S. Application Data

(63) Continuation-in-part of application No. 12/249,341, filed on Oct. 10, 2008, now Pat. No. 8,002,923, which is a continuation of application No. PCT/JP2007/072204, filed on Nov. 15, 2007.

(30) Foreign Application Priority Data

Nov. 15, 2006  (JP) ................................ 2006-309638

(51) Int. Cl.
*C03B 23/037*  (2006.01)
*C03B 23/26*  (2006.01)
*G11B 5/84*  (2006.01)

(52) U.S. Cl.
CPC ............... *C03B 23/037* (2013.01); *C03B 23/26* (2013.01); *G11B 5/8404* (2013.01)

(58) Field of Classification Search
CPC ...... C03B 23/26; C03B 23/037; C03B 21/02; C03B 21/04
USPC ........................ 65/93–94, 104, 105
See application file for complete search history.

(56) References Cited

U.S. PATENT DOCUMENTS

| | | | | |
|---|---|---|---|---|
| 3,251,670 | A | * | 5/1966 | Acloque .......................... 65/115 |
| 4,071,343 | A | * | 1/1978 | Siegmund ......................... 65/23 |
| 5,486,276 | A | * | 1/1996 | Kitamoto et al. .......... 204/192.2 |
| 6,113,753 | A | * | 9/2000 | Washburn ................ 204/192.15 |
| 6,187,441 | B1 | | 2/2001 | Takeuchi et al. |
| 6,341,999 | B1 | * | 1/2002 | Ohmori et al. ................... 451/44 |
| 6,718,612 | B2 | * | 4/2004 | Bajorek ........................... 29/424 |
| 7,040,953 | B2 | * | 5/2006 | Matsuno et al. ................... 451/5 |
| 7,187,510 | B2 | * | 3/2007 | Yasunaga et al. ............... 360/16 |
| 8,101,049 | B2 | * | 1/2012 | Reiter et al. .............. 204/192.2 |
| 2001/0014573 | A1 | * | 8/2001 | Shimoi et al. ................... 451/41 |

(Continued)

FOREIGN PATENT DOCUMENTS

| | | |
|---|---|---|
| JP | 63-64460 | 4/1988 |
| JP | 06-198530 | 7/1994 |
| JP | 11-198012 | 7/1999 |
| JP | 11-219521 | 8/1999 |
| JP | 2000-052212 | 2/2000 |
| JP | 2000-218482 | 8/2000 |
| JP | 2001-2451 | 1/2001 |

(Continued)

OTHER PUBLICATIONS

Japanese Office Action issued Feb. 14, 2012, in Patent Application No. 2006-309638 (with English-language translation).

*Primary Examiner* — Erin Snelting
(74) *Attorney, Agent, or Firm* — Oblon, McClelland, Maier & Neustadt, L.L.P.

(57) ABSTRACT

A method includes forming a glass ribbon by heating and softening a glass plate preform and drawing the glass plate preform to a predetermined thickness in a heating furnace; and performing coring on the glass ribbon in order to form circular substrates in a straight line along a longitudinal direction of the glass ribbon.

6 Claims, 17 Drawing Sheets

(56) References Cited

U.S. PATENT DOCUMENTS

| | | | |
|---|---|---|---|
| 2002/0053121 A1* | 5/2002 | Bajorek | 29/424 |
| 2003/0082999 A1* | 5/2003 | Yoshikawa et al. | 451/41 |
| 2006/0021385 A1* | 2/2006 | Cimo et al. | 65/36 |
| 2006/0042317 A1* | 3/2006 | Miyamoto | 65/61 |
| 2007/0003796 A1* | 1/2007 | Isono et al. | 428/832 |
| 2007/0178281 A1* | 8/2007 | Nakamura et al. | 428/141 |
| 2007/0271957 A1* | 11/2007 | Nakamura et al. | 65/29.14 |
| 2008/0216515 A1* | 9/2008 | Kumada et al. | 65/64 |
| 2009/0038743 A1* | 2/2009 | Suzuki et al. | 156/154 |

FOREIGN PATENT DOCUMENTS

| | | |
|---|---|---|
| JP | 2001-105292 | 4/2001 |
| JP | 2001-129750 | 5/2001 |
| JP | 2001-191238 | 7/2001 |
| JP | 2002-150546 | 5/2002 |
| JP | 2003-159639 | 6/2003 |
| JP | 2003-231044 | 8/2003 |
| JP | 2004-050345 | 2/2004 |
| JP | 2005-225713 | 8/2005 |
| WO | WO 2006070527 A1 * | 7/2006 |

* cited by examiner

FIG. 15A

| STEP | ITEM | EXAMPLE 1 0.85 INCH | EXAMPLE 2 0.85 INCH | EXAMPLE 3 0.85 INCH | EXAMPLE 4 0.85 INCH | EXAMPLE 6 0.85 INCH | EXAMPLE 7 0.85 INCH | EXAMPLE 8 0.85 INCH | EXAMPLE 9 0.85 INCH | EXAMPLE 10 0.85 INCH | COMPARATIVE EXAMPLE 0.85 INCH |
|---|---|---|---|---|---|---|---|---|---|---|---|
| GLASS BLOCK FORMING | TYPE OF GLASS | SODA-LIME GLASS | ↓ | ↓ | ↓ | ↓ | ↓ | ↓ | ↓ | ↓ | ↓ |
| | THIN GLASS PLATE THICKNESS [mm]/THICKNESS OF FINISHED PRODUCT [mm] | 0.38/0.381 | ↓ | ↓ | ↓ | ↓ | ↓ | 0.50/0.381 | 0.60/0.381 | 0.39/0.381 | ↓ |
| | SURFACE ROUGHNESS OF THIN GLASS PLATE [nm] | 0.25 | ↓ | ↓ | ↓ | ↓ | ↓ | ↓ | ↓ | 0.25 | ↓ |
| | NUMBER OF STACKS OF THIN GLASS PLATE (SHEETS) | 25 | ↓ | ↓ | ↓ | ↓ | 1 | 10 | 100 | ↓ | NO STACK |
| | THIN GLASS PLATE FIXATION AND INTEGRATION METHOD | WATER SOLUBLE WAX | ↓ | ↓ | ↓ | FREEZING CHUCK | ↓ | ↓ | ↓ | ↓ | · |
| INSIDE AND OUTSIDE DIAMETER CORING | NUMBER OF ROTATIONS OF GRINDSTONE FOR PROCESSING INSIDE AND OUTSIDE DIAMETERS [rpm] | 20,000 | ↓ | ↓ | ↓ | ↓ | ↓ | ↓ | ↓ | ↓ | ↓ |
| | CIRCUMFERENTIAL SPEED OF INSIDE-DIAMETER PROCESSING GRINDSTONE [m/s] | 6 | ↓ | ↓ | ↓ | ↓ | ↓ | ↓ | ↓ | ↓ | ↓ |
| | BOND TYPE/ GRAIN SIZE OF INSIDE-DIAMETER PROCESSING GRINDSTONE | METAL #320 | ↓ | ↓ | ↓ | METAL #600 | ↓ | ↓ | ↓ | ↓ | ↓ |
| | CIRCUMFERENTIAL SPEED OF OUTSIDE-DIAMETER PROCESSING GRINDSTONE [m/s] | 23 | ↓ | ↓ | ↓ | ↓ | ↓ | ↓ | ↓ | ↓ | ↓ |
| | BOND TYPE/GRAIN SIZE OF OUTSIDE-DIAMETER PROCESSING GRINDSTONE | METAL #320 | ↓ | ↓ | ↓ | METAL #320 | ↓ | ↓ | ↓ | ↓ | ↓ |
| | PROCESSING SPEED [mm/min] | 2 | ↓ | ↓ | ↓ | ↓ | ↓ | ↓ | ↓ | ↓ | ↓ |

FIG. 15B

| STEP | ITEM | EXAMPLE 1 0.85 INCH | EXAMPLE 2 0.85 INCH | EXAMPLE 3 0.85 INCH | EXAMPLE 4 0.85 INCH | EXAMPLE 6 0.85 INCH | EXAMPLE 7 0.85 INCH | EXAMPLE 8 0.85 INCH | EXAMPLE 9 0.85 INCH | EXAMPLE 10 0.85 INCH | COMPARATIVE EXAMPLE 0.85 INCH |
|---|---|---|---|---|---|---|---|---|---|---|---|
| INSIDE AND OUTSIDE SURFACE GRINDING | NUMBER OF REVOLUTIONS OF INNER CIRCUMFERENCE PROCESSING GRINDSTONE [rpm] | 8,000 | ↓ | ↓ | ↓ | ↓ | ↓ | ↓ | ↓ | ↓ | ↓ |
| | CIRCUMFERENTIAL SPEED OF INNER CIRCUMFERENCE PROCESSING GRINDSTONE [m/s] | 3 | ↓ | ↓ | ↓ | ↓ | ↓ | ↓ | ↓ | ↓ | ↓ |
| | BOND TYPE/GRAIN SIZE OF INNER CIRCUMFERENCE PROCESSING GRINDSTONE | ELECTRO-DEPOSITION #400 | ↓ | ↓ | ↓ | ELECTRO-DEPOSITION #600 | ↓ | ↓ | ↓ | ↓ | FORMED ELECTRO-DEPOSITION #500 |
| | INNER-CIRCUMFERENCE MACHINING ALLOWANCE [mm] | 0.3 | ↓ | ↓ | ↓ | ↓ | ↓ | ↓ | ↓ | ↓ | ↓ |
| | INNER-CIRCUMFERENCE PROCESSING SPEED [mm/min] | 0.6 | ↓ | ↓ | ↓ | 0.5 | ↓ | ↓ | ↓ | ↓ | ↓ |
| | NUMBER OF REVOLUTIONS OF OUTER CIRCUMFERENCE PROCESSING GRINDSTONE [rpm] | 4,000 | ↓ | ↓ | ↓ | ↓ | ↓ | ↓ | ↓ | ↓ | ↓ |
| | CIRCUMFERENTIAL SPEED OF OUTER CIRCUMFERENCE PROCESSING GRINDSTONE [m/s] | 32 | ↓ | ↓ | ↓ | ↓ | ↓ | ↓ | ↓ | ↓ | ↓ |
| | BOND TYPE/GRAIN SIZE OF OUTER CIRCUMFERENCE PROCESSING GRINDSTONE | ELECTRO-DEPOSITION #400 | ↓ | ↓ | ↓ | ELECTRO-DEPOSITION #600 | ↓ | ↓ | ↓ | ↓ | FORMED ELECTRO-DEPOSITION #500 |
| | OUTER-CIRCUMFERENCE MACHINING ALLOWANCE [mm] | 0.3 | ↓ | ↓ | ↓ | ↓ | ↓ | ↓ | ↓ | ↓ | ↓ |
| | OUTER-CIRCUMFERENCE PROCESSING SPEED [mm/min] | 1.5 | ↓ | ↓ | ↓ | 0.5 | ↓ | ↓ | ↓ | ↓ | ↓ |
| | NUMBER OF REVOLUTIONS OF WORK [rpm] | 15 | ↓ | ↓ | ↓ | ↓ | ↓ | ↓ | ↓ | ↓ | ↓ |

FIG. 15C

| STEP | ITEM | EXAMPLE 1 0.85 INCH | EXAMPLE 2 0.85 INCH | EXAMPLE 3 0.85 INCH | EXAMPLE 4 0.85 INCH | EXAMPLE 6 0.85 INCH | EXAMPLE 7 0.85 INCH | EXAMPLE 8 0.85 INCH | EXAMPLE 9 0.85 INCH | EXAMPLE 10 0.85 INCH | COMPARATIVE EXAMPLE 0.85 INCH |
|---|---|---|---|---|---|---|---|---|---|---|---|
| INSIDE AND OUTSIDE EDGE CHAMFERING | RATIO OF DIAMETER OF INNER CIRCUMFERENCE PROCESSING GRINDSTONE TO HOLE DIAMETER OF WORK | 0.75 | ↓ | ↓ | ↓ | 0.95 | 0.4 | 0.75 | ↓ | ↓ | ↓ |
| | BOND TYPE/GRAIN SIZE OF INNER CIRCUMFERENCE PROCESSING GRINDSTONE | METAL #800 | METAL #1000 | METAL #1500 | METAL #2000 | METAL #1500 | ↓ | RESIN METAL #1500 | ↓ | ↓ | ↓ |
| | NUMBER OF REVOLUTIONS OF INNER CIRCUMFERENCE PROCESSING GRINDSTONE [rpm] | 10,000 | ↓ | ↓ | ↓ | ↓ | ↓ | ↓ | ↓ | ↓ | ↓ |
| | CIRCUMFERENTIAL SPEED OF INNER CIRCUMFERENCE PROCESSING GRINDSTONE [m/s] | 2 | ↓ | ↓ | ↓ | ↓ | ↓ | ↓ | ↓ | ↓ | ↓ |
| | INNER-CIRCUMFERENCE MACHINING ALLOWANCE [mm] | 0.07 | ↓ | ↓ | ↓ | ↓ | ↓ | ↓ | ↓ | ↓ | ↓ |
| | INNER-CIRCUMFERENCE PROCESSING SPEED [mm/min] | 0.3 | 0.2 | 0.15 | 0.1 | 0.15 | 0.1 | 0.15 | ↓ | 0.20/0.15 TWO STAGES | ↓ |
| | NUMBER OF REVOLUTIONS OF INNER CIRCUMFERENCE PROCESSING WORK [rpm] | 300 | ↓ | ↓ | ↓ | ↓ | ↓ | ↓ | ↓ | ↓ | ↓ |
| | RATIO OF DIAMETER OF OUTER CIRCUMFERENCE PROCESSING GRINDSTONE TO DIAMETER OF WORK | 0.75 | ↓ | ↓ | ↓ | 0.95 | ↓ | ↓ | ↓ | ↓ | ↓ |
| | BOND TYPE/GRAIN SIZE OF OUTER CIRCUMFERENCE PROCESSING GRINDSTONE | METAL #800 | METAL #1000 | METAL #1500 | METAL #2000 | METAL #1500 | ↓ | ↓ | ↓ | METAL #1500 | ↓ |
| | NUMBER OF REVOLUTIONS OF OUTER CIRCUMFERENCE PROCESSING GRINDSTONE [rpm] | 10,000 | ↓ | ↓ | ↓ | ↓ | ↓ | ↓ | ↓ | ↓ | ↓ |
| | CIRCUMFERENTIAL SPEED OF OUTER CIRCUMFERENCE PROCESSING GRINDSTONE [m/s] | 8 | ↓ | ↓ | ↓ | ↓ | ↓ | ↓ | ↓ | ↓ | ↓ |
| | OUTER-CIRCUMFERENCE MACHINING ALLOWANCE [mm] | 0.07 | ↓ | ↓ | ↓ | ↓ | 0.85 | ↓ | ↓ | ↓ | ↓ |
| | OUTER-CIRCUMFERENCE PROCESSING SPEED [mm/min] | 0.3 | 0.2 | 0.15 | 0.1 | 0.15 | ↓ | 0.15 | 0.15 | 0.30/0.15 TWO STAGES | ↓ |
| | NUMBER OF REVOLUTIONS OF OUTER CIRCUMFERENCE PROCESSING WORK [rpm] | 200 | ↓ | ↓ | ↓ | ↓ | ↓ | ↓ | ↓ | ↓ | ↓ |

FIG. 16A

| STEP | ITEM | EXAMPLE 1 0.85 INCH | EXAMPLE 2 0.85 INCH | EXAMPLE 3 0.85 INCH | EXAMPLE 4 0.85 INCH | EXAMPLE 6 0.85 INCH | EXAMPLE 7 0.85 INCH | EXAMPLE 8 0.85 INCH | EXAMPLE 9 0.85 INCH | EXAMPLE 10 0.85 INCH | COMPARATIVE EXAMPLE 0.85 INCH |
|---|---|---|---|---|---|---|---|---|---|---|---|
| INNER CIRCUMFERENCE TEST DATA AFTER CHAMFERING | NUMBER OF OCCURRENCES OF CHIPPING WITH CHIPPING LENGTH OF 5 μm OR MORE (PCS/SHEET) | 15 | 1 | 0 | 0 | 0 | 0 | 0 | 0 | 0 | 300 OR MORE |
| | MAXIMUM LENGTH OF CHIPPING [μm] | 9 | 6 | 4 OR LESS | 4 OR LESS | 4 OR LESS | 4 OR LESS | 4 OR LESS | 4 OR LESS | 4 OR LESS | 25 |
| | MAXIMUM DEPTH OF CHIPPING [μm] | 1.7 | 0.9 | 1 OR LESS | 1 OR LESS | 1 OR LESS | 1 OR LESS | 1 OR LESS | 1 OR LESS | 1 OR LESS | 100 OR MORE |
| OUTER CIRCUMFERENCE TEST DATA AFTER CHAMFERING | NUMBER OF OCCURRENCE OF CHIPPING WITH CHIPPING LENGTH OF 5 μm OR MORE (PCS/SHEET) | 16 | 1 | 0 | 0 | 0 | 0 | 0 | 0 | 0 | 300 OR MORE |
| | MAXIMUM LENGTH OF CHIPPING [μm] | 10 | 7 | 4 OR LESS | 4 OR LESS | 4 OR LESS | 4 OR LESS | 4 OR LESS | 4 OR LESS | 4 OR LESS | 21 |
| | MAXIMUM DEPTH OF CHIPPING [μm] | 2.0 | 1.4 | 1 OR LESS | 1 OR LESS | 1 OR LESS | 1 OR LESS | 1 OR LESS | 1 OR LESS | 1 OR LESS | 100 OR MORE |
| APPEARANCE OF SUBSTRATE AFTER CHAMFERING | PRESENCE OF CHUCKING FAULT AND SCRATCH | NONE | NONE | NONE | NONE | NONE | NONE | NONE | NONE | NONE | PRESENT |

FIG. 16B

| STEP | ITEM | EXAMPLE 1 0.85 INCH | EXAMPLE 2 0.85 INCH | EXAMPLE 3 0.85 INCH | EXAMPLE 4 0.85 INCH | EXAMPLE 6 0.85 INCH | EXAMPLE 7 0.85 INCH | EXAMPLE 8 0.85 INCH | EXAMPLE 9 0.85 INCH | EXAMPLE 10 0.85 INCH | COMPARATIVE EXAMPLE 0.85 INCH |
|---|---|---|---|---|---|---|---|---|---|---|---|
| TEST DATA AFTER POLISHING OF INSIDE AND OUTSIDE SURFACES | INNER CIRCUMFERENCE: NUMBER OF REMAINING CHIPPINGS WITH CHIPPING LENGTH OF 1 μm OR MORE (PCS/SHEET) | 0 | 0 | 0 | 0 | 0 | 0 | 0 | 0 | 0 | 300 OR MORE |
| | OUTER CIRCUMFERENCE: NUMBER OF REMAINING CHIPPINGS WITH CHIPPING LENGTH OF 1 μm OR MORE (PCS/SHEET) | 0 | 0 | 0 | 0 | 0 | 0 | 0 | 0 | 0 | 300 OR MORE |
| | INNER CIRCUMFERENCE: NUMBER OF REMAINING CHIPPINGS (PCS/SHEET) | 0 | 0 | 0 | 0 | 0 | 0 | 0 | 0 | 0 | 300 OR MORE |
| | OUTER CIRCUMFERENCE: NUMBER OF REMAINING CHIPPINGS (PCS/SHEET) | 0 | 0 | 0 | 0 | 0 | 0 | 0 | 0 | 0 | 300 OR MORE |
| APPEARANCE OF SUBSTRATE SURFACE AFTER POLISHING OF SUBSTRATE SURFACE | PRESENCE OF CHUCKING FAULT AND SCRATCH | NONE | NONE | NONE | NONE | NONE | NONE | NONE | NONE | NONE | PRESENT |
| | SURFACE ROUGHNESS [nm] | 0.2 OR LESS | 0.2 OR LESS | 0.2 OR LESS | 0.2 OR LESS | 0.2 OR LESS | 0.2 OR LESS | 0.2 OR LESS | 0.2 OR LESS | 0.2 OR LESS | 0.2 OR LESS |

|  | RECTANGULAR GLASS SUBSTRATE | | | ANNULAR GLASS SUBSTRATE | | |
| --- | --- | --- | --- | --- | --- | --- |
|  | FLATNESS AVERAGE | FLATNESS MAXIMUM VALUE | STANDARD DEVIATION | FLATNESS AVERAGE | FLATNESS MAXIMUM VALUE | STANDARD DEVIATION |
| EXAMPLE 11 | 0.95 μm | 2.98 μm | 0.68 μm | 1.03 μm | 3.12 μm | 0.7 μm |
| EXAMPLE 12 | 2.28 μm | 3.72 μm | 0.79 μm | 2.56 μm | 4.01 μm | 0.82 μm |
| COMPARATIVE EXAMPLE 2 | 1.32 μm | 3.41 μm | 0.71 μm | 4.43 μm | 9.51 μm | 1.79 μm |
| COMPARATIVE EXAMPLE 3 | 2.41 μm | 3.90 μm | 0.81 μm | 5.72 μm | 12.08 μm | 2.27 μm |

METHOD OF MANUFACTURING GLASS SUBSTRATE

CROSS-REFERENCE TO RELATED APPLICATIONS

This application is a continuation-in-part of U.S. application Ser. No. 12/249,341, filed on Oct. 10, 2008, which is a continuation of PCT/JP2007/072204 filed on Nov. 15, 2007, the entire contents of which are incorporated herein by reference.

BACKGROUND OF THE INVENTION

1. Field of the Invention

The present invention relates to a method of manufacturing a glass substrate for a magnetic disk device such as a hard disk device.

2. Description of the Related Art

Recently, a large-capacity hard disk device is mounted in an information terminal such as a personal computer, a car navigation system, a mobile phone, and a portable music player, and a magnetic disk capable of performing high-density recording is used for this type of large-capacity hard disk device. As a substrate for the magnetic disk capable of performing high-density recording, a glass substrate having excellent surface smoothness and high rigidity is used. The glass substrate has a disc shape with a circular hole at the center, that is, an annular shape. However, if an edge portion on the internal circumference or external circumference has a sharp shape with an angled edge, cracking is likely to occur and its mechanical strength is degraded. Therefore, chamfering of the edge portion is applied.

The chamfering is performed, for example, by a method described in Japanese Patent Application Laid-open No. 2003-231044. However, in the conventional method, chipping occurs from a chamfered portion toward a main surface, which is a recording surface of the glass substrate.

FIG. 21 is an explanatory diagram of chipping that occurs on the glass substrate, which is an enlarged cross section of an end portion of a glass substrate 7. As shown in FIG. 21, chipping C has occurred with a length of C1 and a depth of C2 from a chamfered portion 77 toward a main surface 71 of the glass substrate 7. Reference numeral 73 denotes an outside surface of the glass substrate 7, and reference numeral 79 denotes the surface of an ideal chamfered portion. The chipping occurs due to wear (line, collapse of shape) of a groove on a grindstone for chamfering or degradation of rotation accuracy of the grindstone and the glass substrate at the time of chamfering. As the thickness of the glass substrate becomes thinner and the surface state thereof becomes mirror-finished surface, chipping is likely to occur, and a large-size chipping depth is equal to or more than 100 μm.

As a method of suppressing the chipping, for example, an ELID grinding method (Electrolytic in-process dressing method) described in Japanese Patent Application Laid-open No. 2001-105292 has been proposed. According to this method, however, even if the chipping size can be decreased, an ELID electrode and a voltage applying unit are required, which are expensive. Further, a machining allowance increases, and because a fine high-count grindstone is used, a machining time becomes too long, which is not practical.

Under such a background, a conventional method of manufacturing the glass substrate for the magnetic disk includes, as described in Japanese Patent Application Laid-open No. 2005-225713, a first lapping step of forming a glass preform having a thickness several times thicker than a thickness of a finished product according to a method such as press-forming or plate-glass forming method, and sequentially lapping a main surface of the glass preform; an inside and outside diameter-coring step of forming an annular glass substrate by coring; and an inside and outside edge-chamfering step of performing grinding of inside and outside surfaces and chamfering of an edge portion. Further, an inside and outside surface-polishing step is performed for polishing the inside and outside surfaces, and thereafter, at a second lapping step, the thickness is adjusted to the thickness of the finished product, and the surface of the glass substrate is lapped considerably to remove chipping, and then, polishing is performed for a plurality of times, to obtain a mirror finished surface of the glass substrate.

On the other hand, as a method of preventing occurrence of the chipping at the time of forming the annular glass substrate by coring, a method of performing the coring in a state in which a plurality of glass substrates are overlapped and integrated is disclosed in Japanese Patent Application Laid-open No. H6-198530.

In the conventional method, however, because the surface of the glass substrate is lapped considerably to remove the chipping, investment for a lapping device is required, and loss of the glass material increases, and the process time increases, thereby causing a cost increase in manufacturing the glass substrate. Further, even if the method of performing the coring in the state in which a plurality of glass substrates are overlapped and integrated is used, occurrence of the chipping cannot be prevented sufficiently at the time of chamfering at the subsequent step. Therefore, a lapping for removing the chipping is required, thereby causing the same problem as above.

SUMMARY OF THE INVENTION

It is an object of the present invention to at least partially solve the problems in the conventional technology.

According to an aspect of the present invention, there is provided a method includes forming a glass ribbon by heating and softening a glass plate preform and drawing the glass plate preform to a predetermined thickness in a heating furnace; and performing coring on the glass ribbon in order to form circular substrates in a straight line along a longitudinal direction of the glass ribbon.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a table of various conditions in each step at the time of manufacturing the annular glass substrates according to Examples 1 to 10 and a Comparative Example;

FIG. 16 is a table of various characteristics of the annular glass substrates according to the Examples 1 to 10 and the Comparative Example;

DETAILED DESCRIPTION OF THE PREFERRED EMBODIMENTS

Exemplary embodiments of a glass substrate manufacturing method according to the present invention will be explained below in detail with reference to the accompanying drawings. The present invention is not limited to the embodiments.

Figure 1:
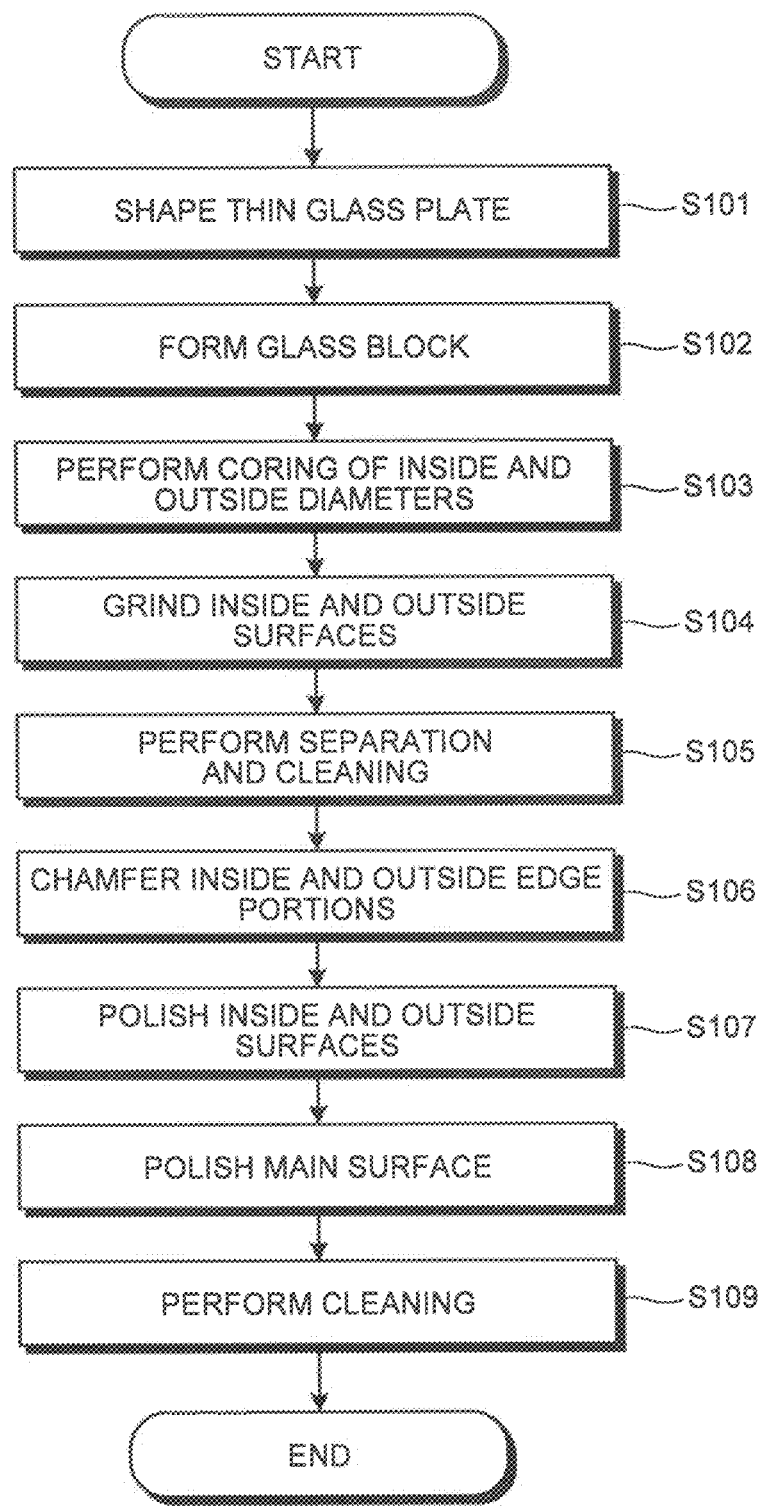
FIG. 1 is a flowchart of a glass substrate manufacturing method according to an embodiment of the present invention.

FIG. 1 is a flowchart of a glass substrate manufacturing method according to an embodiment of the present invention. In FIG. 1, first, a thin glass plate is first formed as a starting glass matrix (Step S101). A plurality of thin glass plates are then laminated, firmly fixed, and integrated to form a glass block (Step S102). The formed glass block is then cored to form an annular glass block (Step S103). Inside and outside surfaces of the formed annular glass block are then ground (Step S104). The annular glass block is then separated into individual annular glass substrates and cleaned to remove a bonding material or the like (Step S105). Inside and outside edge portions of the annular glass substrate are then chamfered (Step S106). Polishing of the inside and outside surfaces of the annular glass substrate is then performed (Step S107), and a main surface of the annular glass substrate is polished (Step S108). The annular glass substrate is then cleaned (Step S109), to complete a desired glass substrate.

According to the present embodiment, the thin glass plate is cored in a state of the glass block to form the annular glass block, and grinding of the inside and outside surfaces is performed in the state of the annular glass block to obtain the size of the finished product. Because a chipping size is sufficiently suppressed to a size smaller than the machining allowance at the chamfering step, chamfering can be performed with a necessity minimum machining allowance under a condition with occurrence of chipping being suppressed. Accordingly, occurrence of chipping in the inside and outside edge portions of the annular glass substrate can be suppressed, the ground amount of the glass substrate for obtaining the thickness of the finished product can be reduced considerably. Respective steps specifically are explained below.

First, as for forming of the thin glass plate at Step S101, a known manufacturing methods such as a float glass process using melt glass as a raw material, a fusion process, a down-drawing process, or a redrawing process in which a plate glass is heated and drawn is used to manufacture the thin glass plate, and the thin glass plate is cut into predetermined sizes and used.

Figure 2:
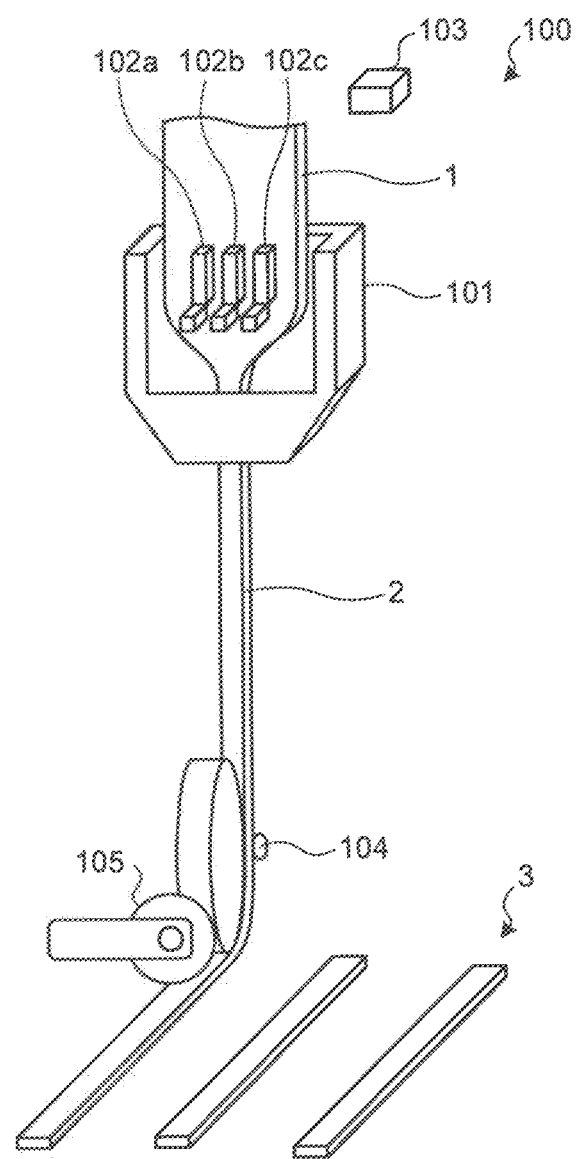
FIG. 2 is a schematic diagram for depicting a heat drawing apparatus for performing a redrawing process.

FIG. 2 is a schematic diagram for depicting a heat drawing apparatus for performing the redrawing process. The heat drawing apparatus 100 includes a heating furnace 101 that has heaters 102a to 102c to heat a glass plate preform 1, a preform feed mechanism 103 that feeds the glass plate preform 1 to the heating furnace 101, a receiving mechanism 104 that pulls out a glass ribbon 2 from the heating furnace 101, and a cutter 105 for forming and cleaving a groove on the surface of the glass ribbon to form a thin glass plate 3 having a predetermined length. The thin glass plate 3 is formed by cleaving the glass ribbon 2 formed by heating and drawing the glass plate preform 1 by the heating furnace 101 to a predetermined length.

The thin glass plate 3 is preferably the one having a mirror finished surface and a high thickness accuracy (for example, a thickness tolerance of ± several μm). For example, if Ra, which is the mean surface roughness of the thin glass plate 3, is equal to or less than 100 nm, it is preferable that the surface is the mirror finished surface, and more preferably, Ra is equal to or less than 10 nm, and particularly, equal to or less than 1 nm. The mean surface roughness in the specification conforms to an arithmetical average height of roughness curve according to JIS B0601:2001. To further decrease a material loss, it is preferable that the thickness of the thin glass plate 3 is thicker than the thickness of the finished glass substrate by equal to or less than 0.2 mm, which is the machining allowance at a polishing step, and more preferably, thicker by equal to or less than 0.1 mm, and particularly, by equal to or less than 0.02 mm. Further, as the material of the thin glass plate 3, glass ceramics such as amorphous glass or crystallized glass can be used. It is preferable to use amorphous glass from standpoints of formability and workability, for example, aluminosilicate glass, soda-lime glass, soda aluminosilicate glass, alumino-boro-silicate glass, borosilicate glass, and physically strengthened glass and chemically strengthened glass subjected to cooling by wind or liquid cooling.

Figure 3:
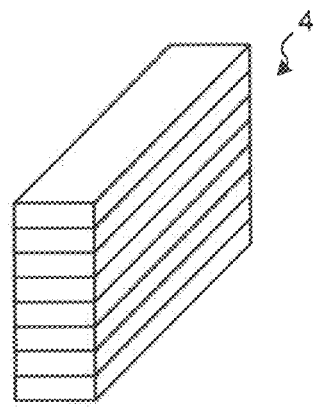
FIG. 3 is a perspective schematic diagram for depicting a formed glass block.

In formation of the glass block shown at Step S102, a glass block 4 shown in FIG. 3 is formed next. As the firmly fixing and integrating method at the time of forming the glass block, a known fixation method can be used, such as a method of filling and curing a bonding material such as a wax, a ultraviolet curable resin, a glue, or an adhesive between the thin glass plates, a method of adhering the thin glass plates to each other by using paper, a nonwoven fabric, or a plastic tape with adhesives, or a freezing fixation method using a low-temperature coagulant and a cooling apparatus. Particularly, it is preferable to use a water soluble wax or a freezing chuck method, by which the fixed and integrated thin glass plates can be easily peeled one by one by using hot water, boiled water, water, or an organic solvent at a subsequent cleaning step.

Figure 4:
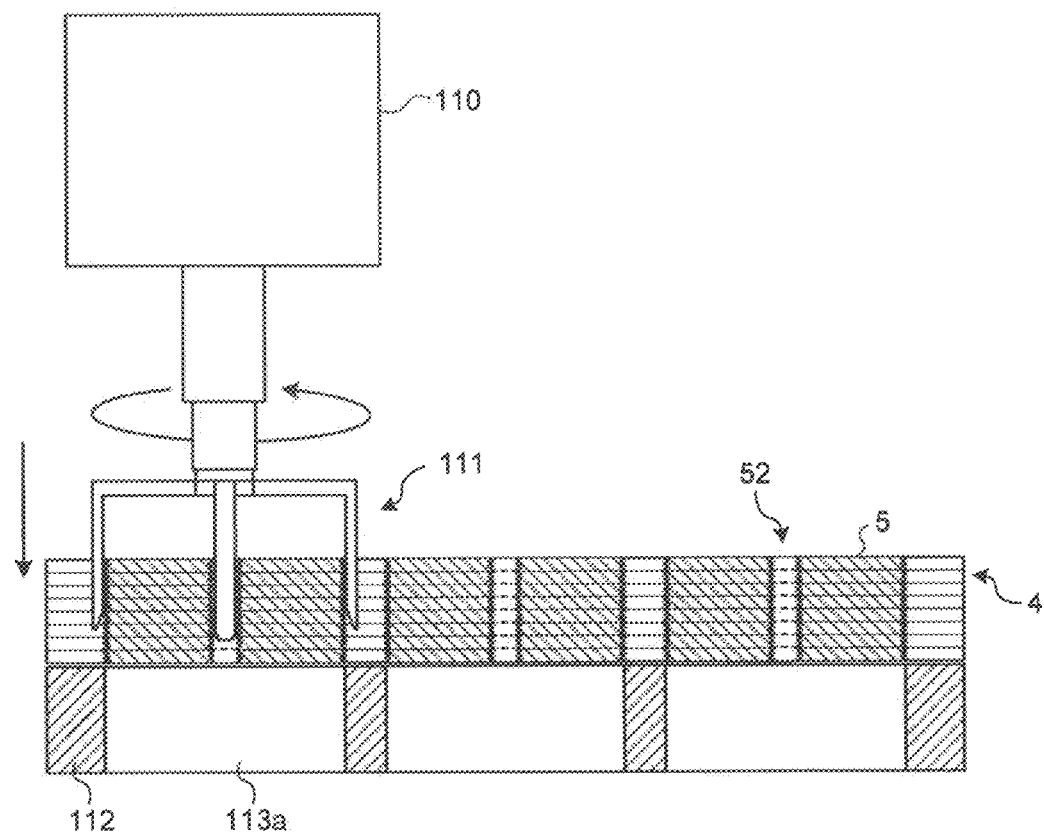
FIG. 4 explains formation of an annular glass block.

Next, as for the formation of the annular glass block at Step S103, as shown in FIG. 4, it is preferable to use an apparatus equipped with a double-core grindstone 111 in which an inside-diameter processing grindstone and an outside-diameter processing grindstone are arranged coaxially at the point of a spindle 110. Further, it is preferable to use a method of forming an annular glass block 5 having a circular hole 52 at the center, by rotating and driving the double-core grindstone 111 downward toward the glass block 4 fixed on a fixed base 112 by a fixing unit 113a such as adsorption, clamping, or freezing chuck, and performing grinding, while supplying a grinding fluid to the glass block 4 and the double-core grindstone 111, to form an outside diameter and an inside diameter simultaneously.

As described above, by coring the thin glass plate 3 in the state of the glass block 4, the inside and outside edge portions of the respective thin glass plates 3 are formed, while being pressed by at least the thin glass plate 3 fixed on the upper side or lower side. As a result, even if the thin glass plate 3 has the mirror finished surface and a thickness prone to chipping in the edge portions, occurrence of the chipping in the edge portions can be suppressed at the time of coring, and a chipping depth to be generated becomes shallow.

Figure 5:
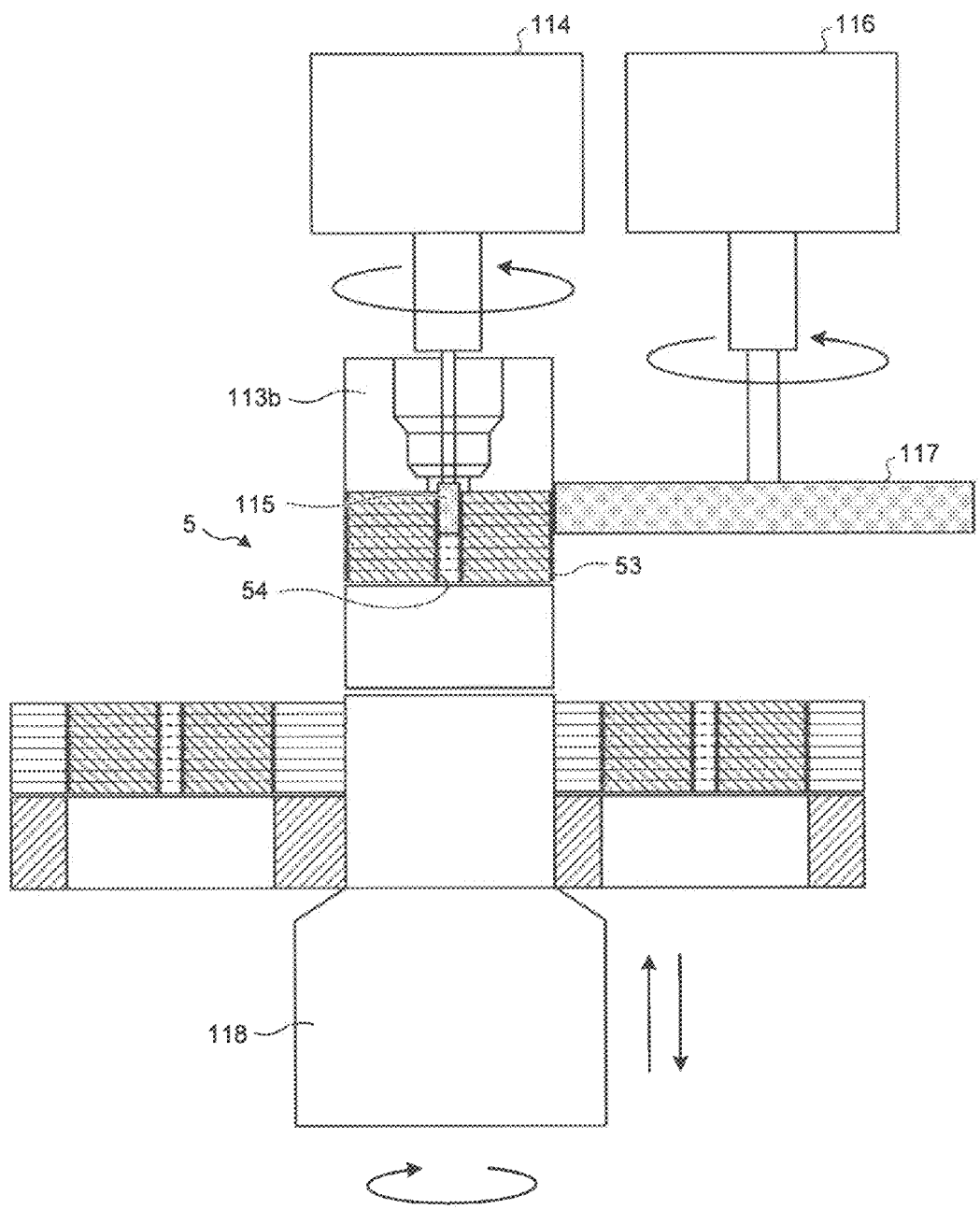
FIG. 5 is an explanatory diagram of grinding inner and outer circumferences of the annular glass block.

Next, as for grinding of the internal and external circumferences of the annular glass block shown at Step S104, as shown in FIG. 5, it is preferable to perform grinding in a predetermined amount to finish the annular glass block 5 in the finished product size in a following manner. That is, the annular glass block 5 is rotated in a state being fixed by the fixing unit 113a and a fixing unit 113b such as adsorption, clamping, or freezing chuck, and cylindrical or columnar outside surface grinding grindstone 117 and inside surface grinding grindstone 115 fitted to respective ends of spindles 114 and 116 are arranged in predetermined positions, respectively, and rotated at a high speed. The outside surface grinding grindstone 117 and the inside surface grinding grindstone 115 are pressed against an outside surface 53 and an inside surface 54 of the annular glass block 5, so that the annular glass block 5 is put therebetween, and moved up and down by a stage 118, to move the annular glass block 5 up and down. Accordingly, grinding is performed for a predetermined amount, to finish the annular glass block in the finished product size.

As described above, because the inside and outside surfaces are ground in the state of the annular glass block, the inside and outside surfaces of respective annular glass substrates are ground, while the inside and outside edge portions of each annular glass substrate are pressed by a annular glass substrate fixed at least to the upper side or the lower side. As a result, even if the thin glass plate 3 has the mirror finished surface and a thickness prone to chipping in the edge portions, occurrence of chipping in the edge portions can be suppressed at the time of grinding the internal and external circumferences and a chipping depth to be generated becomes shallow.

Further, because the annular glass substrate positioned inside of the annular glass block 5 is not brought into contact with the fixing units 113a and 113b, it can be prevented that a chucking fault occurs on the main surface of the annular glass substrate. For the annular glass substrate positioned uppermost or lowermost and coming in contact with the fixing units 113a and 113b, the chucking fault may occur. Therefore, it is desired to put a dummy plate glass between the annular glass block 5 and the fixing units 113a and 113b.

Figure 6:
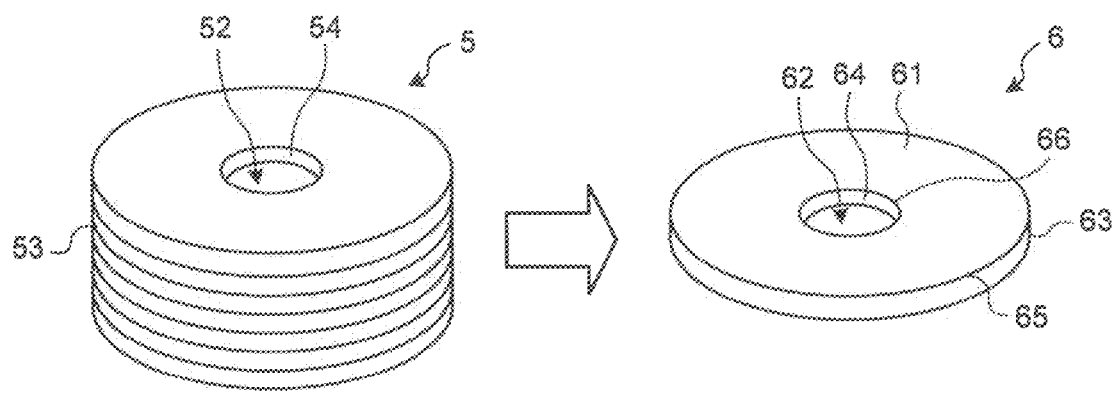
FIG. 6 is a perspective schematic diagram for depicting an annular glass block and a separated and cleaned individual annular glass substrate.

Next, as for the separating and cleaning steps shown at Step S105, as shown in FIG. 6, the annular glass block 5 having the circular hole 52 at the center, with the outside surface 53 and the inside surface 54 thereof being ground, is soaked in a predetermined solvent and ultrasonic waves are applied, to dissolve the bonding material to thereby separate the annular glass block 5 into individual annular glass substrates 6. The respective annular glass substrates 6 are soaked in a predetermined solvent to perform finishing ultrasonic cleaning. The annular glass substrate 6 has a circular hole 62 in the middle of a main surface 61, an outside surface 63, an inside surface 64, an outside edge portion 65, and an inside edge portion 66.

The chamfering of the outside and the inside edge portions 65 and 66 of the annular glass substrate 6 shown at Step S106 is explained next. First, when the outside edge portion 65 is to be chamfered, a positional relation between an outside-edge chamfering grindstone having a cylindrical point with a hollow portion formed therein and having a curved slope formed such that an inside diameter of the point is enlarged toward the point and caved inward and the annular glass substrate is pre-adjusted so that a chamfering angle becomes a desired angle. The hollow portion of the outside-edge chamfering grindstone is preferably pressed against the outside edge portion of the annular glass substrate to perform chamfering, in a state in which the outside-edge chamfering grindstone and the annular glass substrate are respectively rotated.

Figure 7:
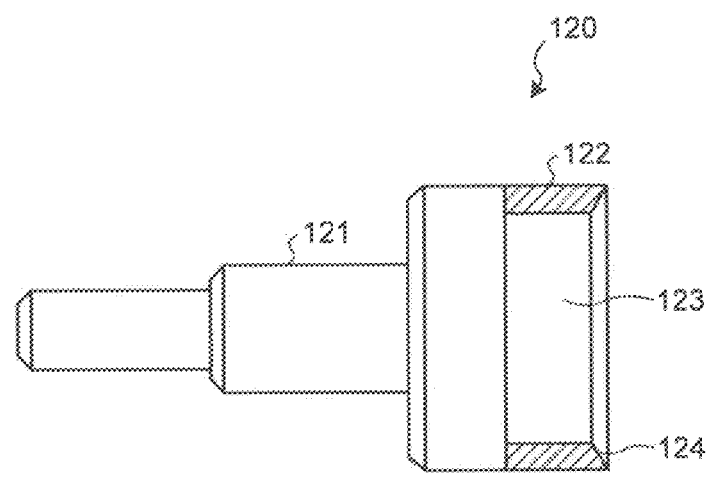
FIG. 7 is a partial cross section of an outside-edge chamfering grindstone.

The outside-edge chamfering grindstone and a method of application thereof are specifically explained below. FIG. 7 is a partial cross section of the outside-edge chamfering grindstone. An outside-edge chamfering grindstone 120 includes a grindstone 122 for grinding the outside edge portion 65 of the annular glass substrate 6, and a grindstone shaft 121 for fixing the grindstone 122 at the point. The grindstone 122 is fixed coaxially with the grindstone shaft 121.

Figure 8:
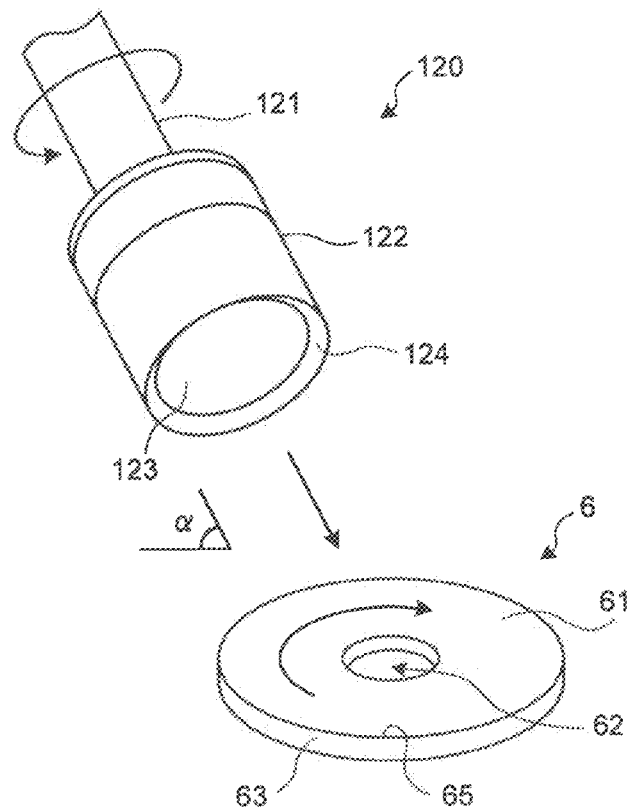
FIG. 8 explains how the outside-edge chamfering grindstone is applied to the annular glass substrate.

The grindstone 122 has a cylindrical shape having a hollow portion 123 formed therein, and an end surface 124 thereof is used as a grinding surface. As shown in FIG. 8, the end surface 124 is a curved inclined surface such that it is expanded to an outside diameter side toward the point and caved inward, so that when a central axis of rotation of the grindstone is inclined with respect to the main surface 61 of the annular glass substrate 6 at a predetermined angle α, and the end surface 124 is abutted against the outside edge portion 65 so that the hollow portion 123 of the grindstone 122 faces the outside edge portion 65 of the annular glass substrate 6, the end surface 124 of the grindstone 122 comes in contact with the outside edge portion 65 substantially in its entirety from the outside diameter side to the inside diameter side. Further, abrasive grains such as diamond abrasive grains are adhered to the end surface 124. The abrasive grains are sintered by at least one bonding material of the electrodeposition method, the metal bond, the resin bond, the resin/metal bond, and the vitrified bond.

Figure 9:
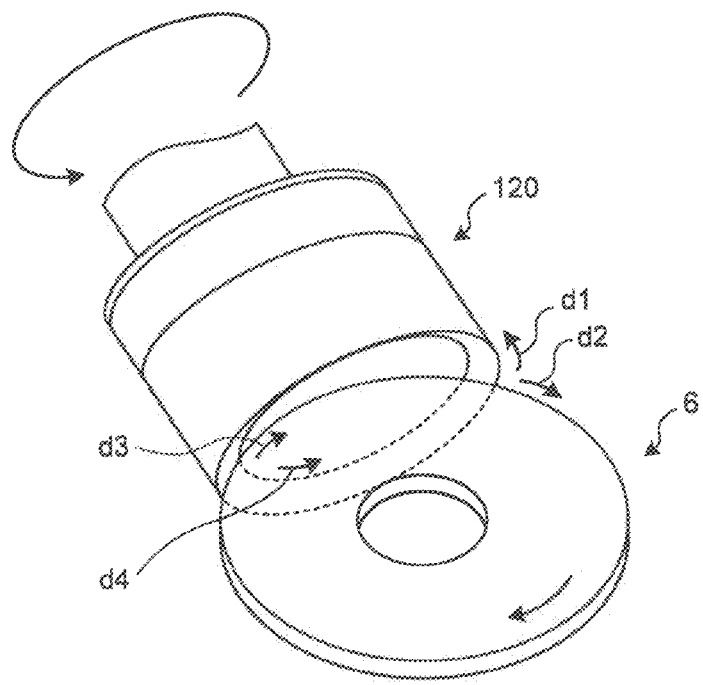
FIG. 9 is a perspective view of a contact state between the outside-edge chamfering grindstone and the annular glass substrate.

When chamfering of the outside edge portion 65 of the annular glass substrate 6 is to be performed, the annular glass substrate 6 is rotated about the circular hole 62, and as shown in FIG. 9, the outside-edge chamfering grindstone 120 is advanced to a predetermined position in a state in which the outside-edge chamfering grindstone 120 is rotated around the grindstone shaft 121 as a central axis, and the end surface 124 of the grindstone 122 is pressed against the outside edge portion 65 of the annular glass substrate 6. As a result, the outside edge portion 65 is ground and chamfered. The rotation direction of the outside-edge chamfering grindstone 120 and that of the annular glass substrate 6 are set such that a grinding speed against each other becomes faster.

At this time, as shown in FIG. 9, the end surface 124 is abutted against the outside edge portion 65 so that the hollow portion 123 of the grindstone 122 faces the outside edge portion 65 of the annular glass substrate 6. Because the end surface 124 of the grindstone 122 is a curved inclined surface caved inward, the end surface 124 of the grindstone 122 comes in contact with the outside edge portion 65 substantially in its entirety from the outside diameter side to the inside diameter side. As a result, grinding can be performed using a wide grindstone face, thereby enabling to perform grinding efficiently and reduce the chamfering time. Further, directions d2 and d3 in which the outside edge portion 65 is rotated and directions d1 and d4 in which the end surface 124 of the grindstone 122 is rotated are nonparallel to each other, that is, the rotation directions of the both cross each other. As a result, on the end surface 124 of the grindstone 122, lines in a specific direction are not formed. Further, striped flaw is hardly formed on the outside chamfered portion of the annular glass substrate 6.

Figure 10:
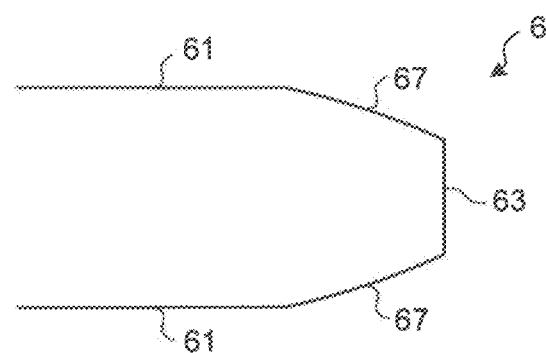
FIG. 10 is a cross section of an outside edge of the annular glass substrate, which has been subjected to chamfering.

Further, the annular glass substrate 6 is ground by the end surface 124 of the grindstone 122, on the opposite sides of the hollow portion 123. In the ground portion on the right side in FIG. 9, the grinding direction is obliquely upward with respect to the annular glass substrate 6, which is a direction obtained by adding direction d1 and direction d2, and in the ground portion on the left side, the grinding direction is obliquely downward with respect to the annular glass substrate 6, which is a direction obtained by adding direction d3 and direction d4. Therefore, the grinding direction in the left and right ground portions becomes different from each other. As a result, a self-dressing effect is obtained with respect to the end surface 124 of the grindstone 122. Accordingly, clogging of the grindstone is reduced, and because annular lines are not formed on the end surface 124, chipping hardly occurs. Further, because the end surface 124 of the grindstone 122 is a curved inclined surface caved inward, as shown in FIG. 10, an outside chamfered portion 67 of the annular glass substrate 6 ground by the grindstone 122 becomes a gradually curved surface extended outward. As a result, chipping hardly occurs in a boundary between the main surface 61 of the annular glass substrate 6 and the outside chamfered portion 67, thereby improving reliability, durability, and yield of the annular glass substrate 6. Furthermore, even if striped flaw is formed in the left ground portion of the annular glass substrate 6, the flaw is negated by the right ground portion, thereby improving finishing accuracy of the outside chamfered portion 67.

Because the end surface 124 of the grindstone 122 comes in contact with the outside edge portion 65 substantially in its entirety from the outside diameter side to the inside diameter side, even if grinding by the grindstone 122 is performed continuously, the end surface 124 wears uniformly, and therefore the curved shape does not change. As a result, chamfering can be performed under specific conditions at all times, thereby further facilitating management of the grindstone 122. Even if the end surface 124 of the grindstone 122 has a straight shape, the above effect that chipping hardly occurs and striped flaw is not caused can be obtained.

After chamfering of the upper outside edge portion 65 of the annular glass substrate 6 finishes, the annular glass substrate 6 is turned over to perform chamfering in the same manner. Accordingly, chamfering of the outside edge portion 65 on the upper and lower sides of the annular glass substrate 6 is complete.

When the inside edge portion 66 is to be chamfered, a positional relation between an inside-edge chamfering grindstone having a cylindrical point with a hollow portion formed therein and having a curved slope formed such that the point is tapered in a truncated-cone side shape and extended outward and the annular glass substrate is pre-adjusted so that a chamfering angle becomes a desired angle. The hollow portion of the inside-edge chamfering grindstone is preferably pressed against the inside edge portion of the annular glass substrate to perform chamfering, in a state in which the inside-edge chamfering grindstone and the annular glass substrate are respectively rotated.

Figure 11:
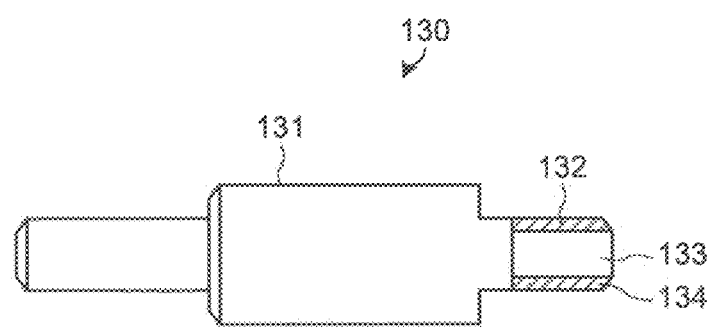
FIG. 11 is a partial cross section of an inside-edge chamfering grindstone.

The inside-edge chamfering grindstone and a method of application thereof are specifically explained below. FIG. 11 is a partial cross section of the inside-edge chamfering grindstone. An inside-edge chamfering grindstone 130 includes a grindstone 132 for grinding the inside edge portion 66 of the annular glass substrate 6, and a grindstone shaft 131 for fixing the grindstone 132 at the point. The grindstone 132 is fixed coaxially with the grindstone shaft 131.

Figure 12:
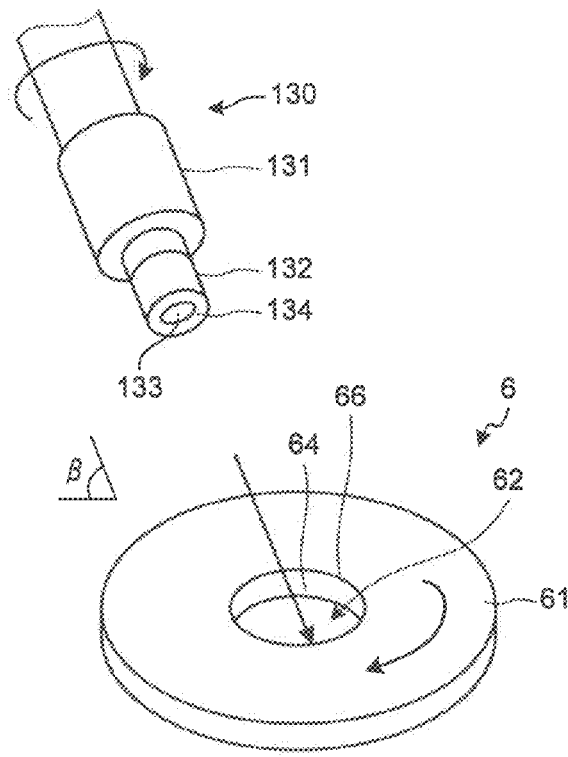
FIG. 12 is a schematic diagram for explaining how the inside-edge chamfering grindstone is applied to the annular glass substrate.

The grindstone 132 has a cylindrical shape having a hollow portion 133 formed therein, and an end surface 134 thereof is used as a grinding surface. As shown in FIG. 12, the end surface 134 is a curved inclined surface such that it is tapered in a truncated-cone side shape and extended outward, so that when a central axis of rotation of the grindstone is inclined with respect to the main surface 61 of the annular glass substrate 6 at a predetermined angle β, and the end surface 134 is abutted against the inside edge portion 66 so that the hollow portion 133 of the grindstone 132 faces the inside edge portion 66 of the annular glass substrate 6, the end surface 134 of the grindstone 132 comes in contact with the inside edge portion 66 substantially in its entirety from the outside diameter side to the inside diameter side. Further, abrasive grains such as diamond abrasive grains are adhered to the end surface 134, as in the case of the outside-edge chamfering grindstone 120.

Figure 13:
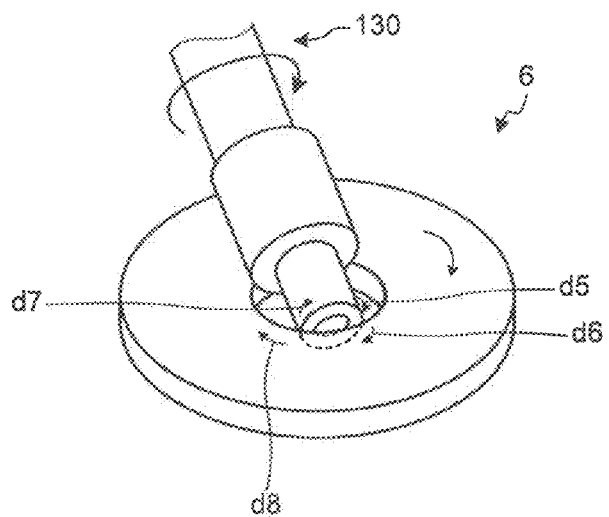
FIG. 13 is a perspective view of a contact state between the inside-edge chamfering grindstone and the annular glass substrate.

When chamfering of the inside edge portion 66 of the annular glass substrate 6 is to be performed, chamfering is performed basically in the same manner as in the outside edge portion 65. That is, the annular glass substrate 6 is rotated about the circular hole 62, and as shown in FIG. 13, the inside-edge chamfering grindstone 130 is advanced from this state to a predetermined position, and the end surface 134 of the grindstone 132 is pressed against the inside edge portion 66 of the annular glass substrate 6. As a result, the inside edge portion 66 is ground and chamfered. The rotation direction of the inside-edge chamfering grindstone 130 and that of the annular glass substrate 6 are set such that the grinding speed against each other becomes faster.

At this time, as shown in FIG. 13, the end surface 134 is abutted against the inside edge portion 66 so that the hollow portion 133 of the grindstone 132 faces the inside edge portion 66 of the annular glass substrate 6. Because the end surface 134 of the grindstone 132 is a curved inclined surface extended outward, the end surface 134 of the grindstone 132 comes in contact with the inside edge portion 66 substantially in its entirety from the outside diameter side to the inside diameter side. As a result, grinding can be performed using a wide grindstone face, thereby enabling to perform grinding efficiently and reduce the chamfering time. Further, directions d6 and d8 in which the inside edge portion 66 is rotated and directions d5 and d7 in which the end surface 134 of the grindstone 132 is rotated are nonparallel to each other, that is, the rotation directions of the both cross each other. As a result, on the end surface 134 of the grindstone 132, lines in a specific direction are not formed. Further, striped flaw is hardly formed on the inside chamfered portion of the annular glass substrate 6.

Further, the annular glass substrate 6 is ground by the end surface 134 of the grindstone 132, on the opposite sides of the hollow portion 133. In the ground portion on the right side in FIG. 13, the grinding direction is obliquely downward with respect to the annular glass substrate 6, which is a direction obtained by adding directions d5 and d6, and in the ground portion on the left side, the grinding direction is obliquely upward with respect to the annular glass substrate 6, which is a direction obtained by adding directions d7 and d8. Therefore, the grinding direction in the left and right ground portions becomes different from each other. As a result, the self-dressing effect is obtained with respect to the end surface 134 of the grindstone 132. Accordingly, clogging of the grindstone is reduced, and because annular lines are not formed on the grinding surface, chipping hardly occurs. Further, even if striped flaw is formed in the left ground portion of the annular glass substrate 6, the flaw is negated by the right ground portion, thereby improving finishing accuracy of the inside chamfered portion.

Because the end surface 134 of the grindstone 132 comes in contact with the inside edge portion 66 substantially in its entirety from the outside diameter side to the inside diameter side, even if grinding by the grindstone 132 is performed continuously, the end surface 134 wears uniformly, and therefore the curved shape does not change. As a result, chamfering can be performed under specific conditions at all times, thereby further facilitating management of the grindstone 132. Even if the end surface 134 of the grindstone 132 has a straight shape, it is possible to obtain the effect that chipping hardly occurs and striped flaw is not caused.

After chamfering of the upper inside edge portion 66 of the annular glass substrate 6 finishes, the annular glass substrate 6 is turned over to perform chamfering in the same manner. Accordingly, chamfering of the inside edge portion 66 on the upper and lower sides of the annular glass substrate 6 is complete.

Figure 14:
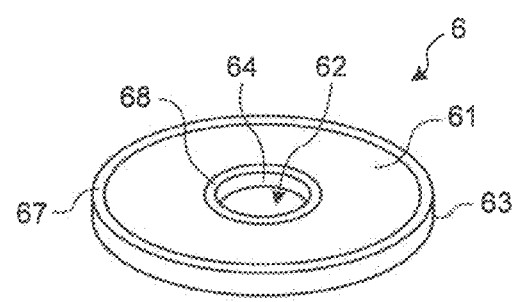
FIG. 14 is a schematic diagram for depicting a finished annular glass substrate.

The polishing of the outside and the inside surfaces 63 and 64 of the annular glass substrate 6 shown at Step S107, polishing of the main surface 61 shown at Step S108, cleaning of the annular glass substrate 6 shown at Step S109 can be performed using the conventional method. FIG. 14 is a schematic diagram for depicting a finished annular glass substrate. The finished annular glass substrate 6 has the circular hole 62 in the middle of the main surface 61, the outside surface 63, the inside surface 64, the outside chamfered portion 67, and an inside chamfered portion 68, with chipping in the outside and the inside chamfered portions 67 and 68 being removed. The finished annular glass substrate 6 is a glass substrate having excellent quality, and manufactured at low cost.

Examples of the present invention and a Comparative example are shown below. The present invention is not limited by these Examples. In Examples 1 to 10, a glass substrate for a magnetic disk having a diameter of 0.85 inches (21.6 mm) was manufactured in the following method according to the embodiment. In the Comparative example, a chamfering machine capable of performing grinding of the inside and outside surfaces and chamfering of the edge portion simultaneously on the inner and outer circumferences, as described in Japanese Patent Application Laid-open No. 2003-231044 was used, and other steps were performed in the same manner as in the Examples. Respective steps are specifically explained with reference to FIG. 15.

First, a soda-lime glass (width: 328 mm×thickness: 5 mm×length: about 1.5 mm) manufactured according to the float glass process was heated and drawn by the heat drawing apparatus shown in FIG. 2, thereby forming a glass ribbon (width: 25 mm×length: several tens mm) having a desired thickness. The obtained glass ribbon was cut into a length of 150 mm to obtain a thin glass plate. The thickness of the thin glass plate was set, as shown in FIG. 15, to the one obtained by adding about 0.01 mm, about 0.12 mm, or about 0.22 mm as a machining allowance at the polishing step, to 0.381 mm, which is the thickness of a finished glass substrate. The mean surface roughness of the thin glass plate was measured by using an AFM (SPM-9500J3 manufactured by Shimadzu Corporation), and the result was 100 nm or less as shown in FIG. 15.

Next, as the method of firmly fixing and integrating the formed thin glass plates in a laminated state, a wax fixation method and a freezing chuck fixation method were adopted. In the wax fixation method, a water soluble wax (Aquawax 80 manufactured by Nikka Seiko Co., Ltd), which dissolves at about 80° C., was used. The wax was applied to the thin glass plate, while heating the thin glass plate on a hot plate, and another thin glass plate was put thereon. This process was repeated to laminate 25 thin glass plates, and the thin glass plates were cooled, firmly fixed, and integrated to form a glass block. In the freezing chuck fixation method, a low-temperature coagulant was applied and filled between the thin glass plates and after 25 thin glass plates were laminated, the laminated thin glass plates were frozen to a temperature at which the low-temperature coagulant was sufficiently solidified by using a cooling device, and then firmly fixed and integrated to form a glass block.

Two types of double-core grindstones shown in FIG. 4 were prepared. That is, one type was such that the inside-diameter processing grindstone and the outside-diameter processing grindstone were both metal bond #320, and the other was such that the outside-diameter processing grindstone was metal bond #320 and the inside-diameter processing grindstone was metal bond #600. The glass block formed at the previous step was ground under conditions shown in FIG. 15 according to the method shown at Step S103, thereby forming an annular glass block. When the freezing chuck method was used, the temperature of the grinding fluid was maintained at −10° C., so that the frozen and fixed state was maintained even during grinding.

Columnar inside and outside surface-grinding grindstones were respectively prepared in two types. The type and the grain size of the grindstones were, respectively, electrodeposition #400 and electrodeposition #600, for the outside surface and the inside surface. The inside surface and the outside surface of the annular glass block formed at the previous step were ground under conditions shown in FIG. 15 to perform coring according to the method shown at Step S104, to finish the annular glass block in the finished product size. When the freezing chuck method was used, the temperature of the grinding fluid was maintained at −10° C., so that the frozen and fixed state was maintained even during grinding.

Next, the annular glass block, with inside and outside surfaces being ground at the previous step, was soaked in warm water with the temperature being adjusted to 80° C. Ultrasonic waves were applied thereto, to dissolve the water soluble wax or the low-temperature coagulant. As finishing cleaning, isopropyl alcohol (IPA) ultrasonic cleaning and drying were performed, thereby obtaining individual annular glass substrates.

The abrasive grains were then sintered as the chamfering grindstone, using the metal bond or resin/metal bond as the bonding material, to prepare several types of chamfering grindstone with the grain size of the grindstones being adjusted to #800 to #2000. For the Examples 1 to 10, the outside-edge chamfering grindstone the same as the one shown in FIG. 7 was used, with the slope of the end surface of the grindstone being straight and an inclination angle being 45 degrees. The inside-edge chamfering grindstone the same as the one shown in FIG. 11 was used, with the slope of the end surface of the grindstone being straight and the inclination angle being 45 degrees. The positions of the chamfering grindstone and the annular glass substrate were adjusted so that the chamfering angle becomes 45 degrees with respect to the main surface of the glass substrate. After the annular glass substrate was placed on an adsorption stage processed in a concentric circular shape by using Duracon resin and was vacuum-adsorbed, chamfering was performed under the conditions shown in FIG. 15 according to the method shown at Step S106. Chamfering was performed in order of from an inside upper face, an inside bottom face, an outside upper face, and an outside bottom face.

Next, 300 annular glass substrates chamfered at the previous step were superposed on a work holder, and mirror polishing was performed with respect to the inside and outside surfaces and the chamfered portion according to a conventionally used brushing method. As the grinding abrasive grains, a slurry (loose grains) containing ceric oxide abrasive grains was used. The polishing was performed in the order of inside and then outside, and the polished annular glass substrate was washed with water, and then subjected to the IPA ultrasonic cleaning as finishing cleaning, and dried.

The annular glass substrate obtained at the previous step was set on a double-face grinding machine having a planetary gear mechanism, and mirror polishing was performed with respect to the main surface thereof until a desired thickness of 0.381 mm was obtained by touch polishing using a soft polisher. As the grinding abrasive grains, a slurry (loose grains) containing colloidal silica abrasive grains was used.

After the annular glass substrate manufactured in the above manner was subjected to chamfering and main-surface polishing, the number and the size (maximum length and maximum depth) of chippings in the inside and outside chamfered portions were measured by using a laser microscope. The mean surface roughness of the main surface of the substrate was then measured by using the AFM (SPM-9500J3 manufactured by Shimadzu Corporation). The result is shown in FIG. 16.

The chipping data is compared between the Examples 1 to 10 and the Comparative Example. In the Comparative Example, the number of occurrence of chippings having a chipping length equal to or more than 5 µm after chamfering is equal to or more than 300, and the largest depth thereof exceeds 20 µm, and even if inside and outside surface polishing and main surface polishing (touch polishing) are applied, chippings remain and cannot be removed completely. That is, to remove chippings according to the method in the Comparative Example, an initially thick plate glass needs to be used and the main surface needs to be ground until chippings are removed, and therefore a large material loss occurs. On the other hand, in the Examples 1 to 10, the number of occurrence of chippings after chamfering is 20 or less, and the maximum depth thereof is considerably improved to equal to or less than 2 µm. The Examples 2 to 10 show that the chipping size can be decreased further regardless of the type of bonding material, by fining down the grinding abrasive grains. However, from a standpoint of productivity, taking the process time into consideration, it is particularly preferable that the grain size of the grindstone is #1000 to #1500. Further, in the Example 10, two-stage processing speeds are used for chamfering, that is, low speed is initially used and then high speed is used. It can be confirmed that the productivity is improved by gradually increasing the processing speed.

In the Examples 6 to 9, although the mean surface roughness of the thin glass plate is different from each other, chipping remainder is not seen after polishing of the main surface in any mean surface roughness, and the mean surface roughness of the main surface is sufficiently satisfactory. It has been confirmed that when fine chippings with the depth being about 1 µm or less are to be removed by polishing of the main surface, fine chippings can be removed by performing touch polishing at least with a thickness three times thicker than the chipping depth. To realize a desired surface roughness on the main surface by touch polishing, it has been confirmed that it is particularly preferable, from the standpoint of productivity, that the thickness of the thin glass plate is thicker than that of the finished glass substrate by equal to or less than 0.02 mm, and that the mean surface roughness of the thin glass plate is equal to or less than 1 nm.

Further, as a result of comparison of the Examples 3, 6, and 7, it has been confirmed that the diameter of the outside-edge chamfering grindstone of a portion coming in contact with the annular glass substrate is preferably from 40% to 95% of the diameter of the annular glass substrate, which is a work to be processed, and that the diameter of the inside-edge chamfering grindstone of a portion coming in contact with the annular glass substrate is preferably from 40% to 95% of the diameter of the annular glass substrate, from standpoints of productivity, positioning workability of the grindstone, and water supply to the annular glass substrate and the grindstone.

In the above embodiment, the configuration is such that the thin glass plates are laminated, firmly fixed, and integrated to form a glass block, and then the inside and outside diameters are simultaneously cored to form an annular glass block. However, coring can be performed separately for the inside diameter and the outside diameter, or the thin glass plate can be formed in a disk-like shape beforehand, and then, a plurality of disk-like thin glass plates can be laminated, firmly fixed, and integrated, and the inside and outside diameters can be cored simultaneously or separately.

In the above-described Examples, a glass ribbon is formed by heating and drawing a glass plate by using the heat drawing apparatus in FIG. 2 and the glass ribbon is cut into thin glass plates each with a width of 25 mm and a length of 150 mm. After the thin glass plates are fixed and integrated in a laminated state and thus a glass block is formed, the glass block is ground by using the double-core grindstones in FIG. 4 and thereby an annular glass block from which magnetic disk glass substrates are obtained is formed.

Figure 17:
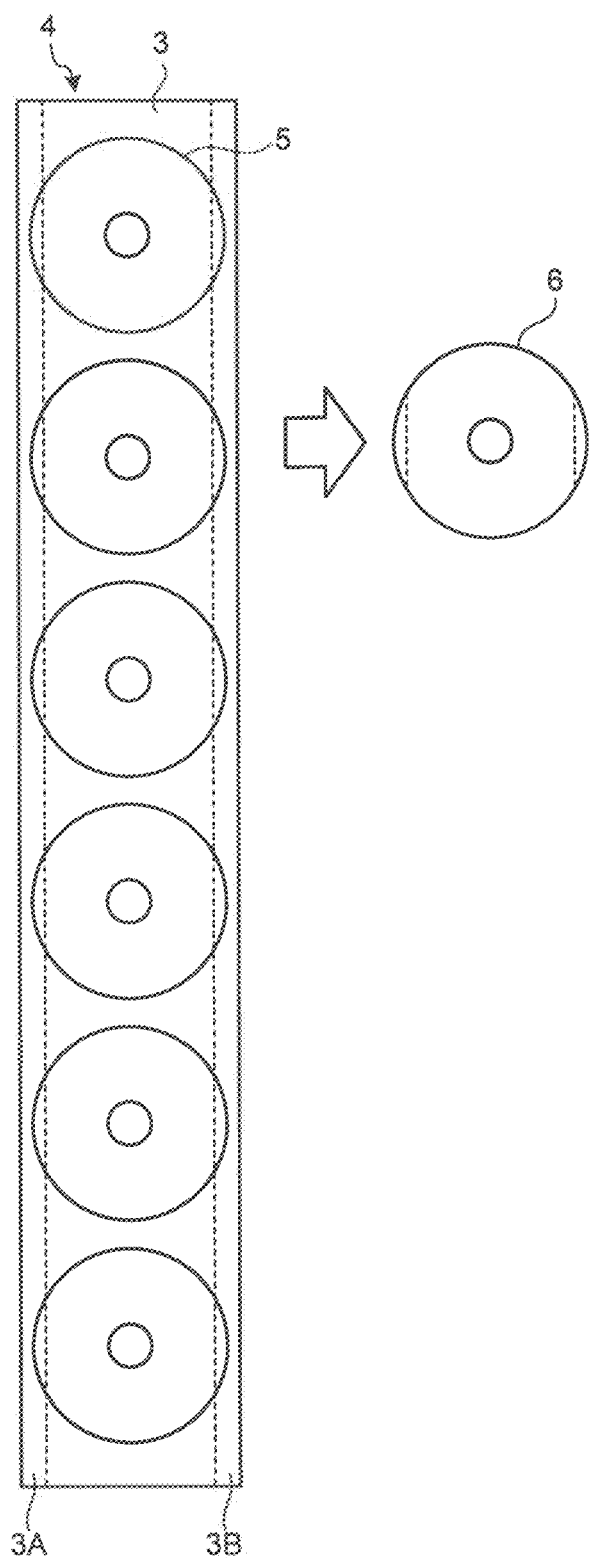
FIG. 17 is a diagram illustrating how coring is performed to form annular glass blocks in a straight line along the longitudinal direction of the glass block, which is formed by laminating thin glass plates, and then annular glass substrates are obtained from the annular glass blocks.

In other words, as shown in FIG. 17, coring is performed to form annular glass blocks 5 in a straight line along the longitudinal direction of the glass block 4, which is formed by laminating the thin glass plates 3, and then annular glass substrates 6 are obtained from the annular glass blocks 5. The straight line is in parallel with a width center line of the glass block 4. The straight line is in the vicinity of, or corresponds with, the width center line. The annular glass plate 6 contains both width-direction end portions 3A and 3B.

Figure 18:
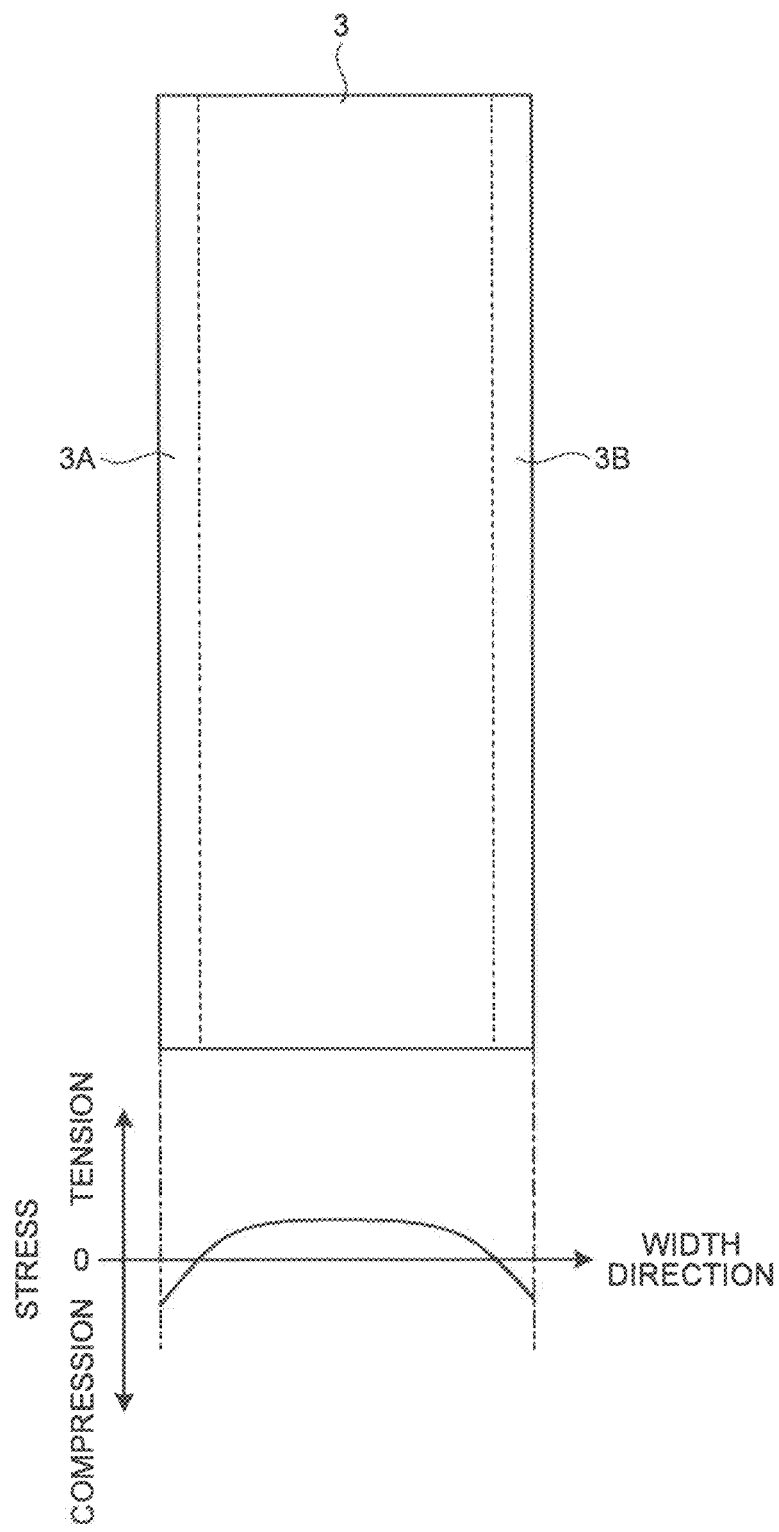
FIG. 18 is a diagram illustrating a thin glass plate with a width-direction stress distribution symmetrical about the width center line.

When a glass ribbon is formed by performing the redrawing process, after the heated and drawn glass ribbon is taken out from the heating furnace, cooling proceeds from both the width-direction end portions. Thus, as shown in FIG. 18, the glass ribbon and the thin glass plates 3 formed from the glass ribbon have a width-direction stress distribution symmetrical about the width center line. A compressive stress remains in the both width-direction end portions 3A and 3B.

For this reason, in the case in FIG. 17, the stress distribution of the annular glass substrate 6 is approximately symmetrical about the width center line. However, when coring is performed to form annular glass blocks in multiple lines arranged in the width direction, the stress distribution of the annular glass substrate 6 may be not symmetrical about the width center line.

When the stress distribution of the thin glass plate is symmetrical about the width center line, the flatness of the thin glass plate is substantially maintained even after coring; therefore, the flatness of the annular glass substrate does not deteriorates due to coring. However, if the stress distribution is not symmetrical about the width center line, a small deformation occurs due to the imbalance of the stress on the surface; therefore, coring may further deteriorate the flatness of the annular glass substrate.

In other words, by performing coring to form annular glass substrates in a straight line along the longitudinal direction of a thin glass plate, annular glass substrates with excellent flatness can be obtained. The straight line is preferably in parallel with and in the vicinity of the width center line of a thin glass plate. The straight line more preferably corresponds with the width center line.

Other Examples and Comparative Examples of the present invention will be described below. The following Examples do no limit the present invention. Here, "flatness" means the difference between the highest point and the lowest point of the curved surface which is formed by the midpoints of the substrate upper surface and the substrate lower surface in the vertical direction in an arbitrary predetermined area on the substrate surface of a rectangular substrate, or an annular glass substrate, placed on a horizontal surface after the substrate is formed. The arbitrary predetermined area is a circle with a diameter of 22.6 mm in Example 11 and Comparative Example 2 and is a circle with a diameter of 66 mm in Example 12 and Comparative Example 3. The flatness was measured using a FlatMaster by Tropel.

Example 11

A soda lime glass (width: 328 mm×thickness: 5 mm×length: 1.5 m), which was manufactured according to the float glass process, was heated and drawn by the heat drawing apparatus and thereby a glass ribbon (width: 25 mm×thickness: 0.393 mm) was formed. The obtained glass ribbon was cut into thin glass plates each with a length of 150 mm.

The cut thin glass plates were sequentially numbered for convenience and odd-numbered plates and even-numbered plates were separated. Accordingly, the flatness distribution can be approximately equal between the group of odd-numbered plates and the group of even-numbered plates.

Each plate of the odd-numbered group was cut into 25 mm to obtain rectangular glass substrates (width: 25 mm×length: 25 mm) and their flatness was measured.

25 even-numbered thin glass plates of the even-numbered group are laminated and thus a glass block was formed. Inside and outside diameter-coring was performed along the width center line. Separation and cleaning were then performed to form annular glass substrates each with a diameter of 23 mm. The flatness of the substrates was measured as that of the odd-numbered group was measured.

Example 12

A soda lime glass (width: 600 mm×thickness: 5 mm×length: 2 m), which was manufactured by the float glass process, was heated and drawn using a heat drawing apparatus, a glass ribbon (width: 80 mm×thickness: 0.650 mm) is formed, and the glass ribbon is cut into thin glass plates each of a length of 280 mm.

In the same manner as that of Example 11, rectangular glass substrates (width: 80 mm×length: 70 mm) and annular glass substrates each with a diameter of 66 mm were formed from the obtained thin glass plates and the flatness of the rectangular glass substrates and the flatness of the substrates were measured.

Comparative Example 2

A soda lime glass (width: 600 mm×thickness: 5 mm×length: 1.5 m), which was manufactured according to the float glass process, was heated and drawn by the heat drawing apparatus and thereby a glass ribbon (width: 47 mm×thickness: 0.393 mm) was formed. The obtained glass ribbon was cut into thin glass plates each with a length of 165 mm.

In the same manner as that of Example 11, an odd-numbered group and an even-numbered group are separated. Each plate of the odd-numbered group is cut into a length of 25 mm to obtain rectangular glass substrates (width: 47 mm×length: 25 mm) and their flatness is measured.

Figure 19:
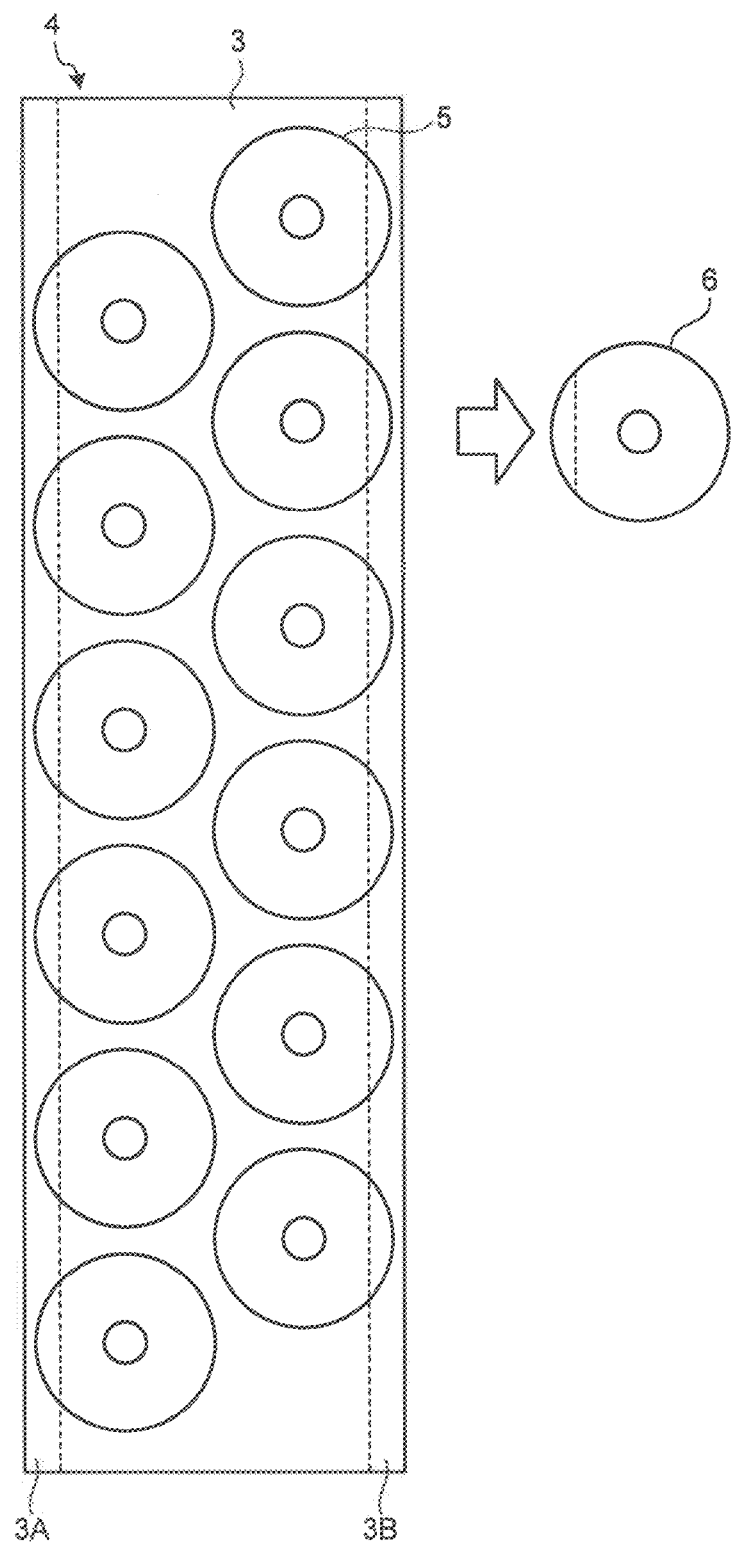
FIG. 19 is a diagram illustrating that coring is performed to form annular glass blocks in multiple lines arranged in the width direction.

25 even-numbered thin glass plates of the even-numbered group are laminated and thus a glass block was formed. As shown in FIG. 19, inside and outside diameter-coring was performed alternately along two lines respectively with 10.9-mm leftward and rightward offsets from the width center line. Separation and cleaning were then performed to form annular glass substrates each with a diameter of 23 mm and their flatness was measured.

Comparative Example 3

A soda lime glass (width: 625 mm×thickness: 3 mm×length: 2 m), which was manufactured according to the float glass process, was heated and drawn by the heat drawing apparatus and thereby a glass ribbon (width: 135 mm×thickness: 0.650 mm) was formed. The obtained glass ribbon was cut into thin glass plates each with a length of 320 mm.

In the same manner as that of Example 11, rectangular glass substrates (width: 135×length: 70 mm) and annular glass substrates each with a diameter of 66 mm were formed from the obtained thin glass plates and their flatness was measured.

The rightward and leftward offsets from the width center line when forming annular glass substrates were both 30.3 mm.

Figures 20, 21:
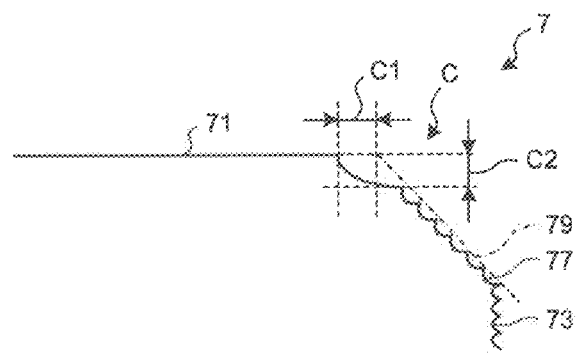
FIG. 20 is a table of results of measuring the flatness of 100 rectangular glass substrates and 100 annular glass substrates that were manufactured for each of Examples 11 and 12 and Comparative Examples 2 and 3.
FIG. 21 is a schematic diagram illustrating a chipping that occurs on a glass substrate.

FIG. 20 is a table of results of measuring the flatness of 100 rectangular glass substrates and 100 annular glass substrates that were manufactured for each of Examples 11 and 12 and Comparative Examples 2 and 3.

As shown in FIG. 20, the flatness of the rectangular substrates and the flatness of the annular glass substrates are substantially equal between Examples 11 and 12 and the absolute value of the difference between their flatness is 3 μm or less. In contrast, in Comparative Examples 2 and 3, the flatness of the annular glass substrates significantly deteriorates. In other words, it was confirmed that the flatness can be prevented from deteriorating by performing coring to form annular glass substrates in a straight line along the longitudinal direction of a thin glass plate. By performing coring to form annular glass substrates in a straight line along the longitudinal direction of a thin glass plate, annular glass substrates with a flatness of 7 μm or less could be easily obtained. By keeping the flatness at 7 μm or less, the subsequent grinding can be simplified. For example, a lapping process may be omitted depending on the case.

The present invention can be applied to manufacturing of the glass substrate not only for magnetic disks for hard disk drives, but also for other recording media such as optical disks and magnet-optical disks.

As described above, according to an aspect of the present invention, a glass substrate with the chipping in the chamfered portion removed can be manufactured at low cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a glass substrate, comprising:
    forming a glass ribbon by heating and softening a glass plate preform and drawing the glass plate preform to a predetermined thickness in a heating furnace; and
    performing coring on the glass ribbon formed by drawing the glass plate preform in order to form annular substrates only in a single straight line along a longitudinal direction of the glass ribbon so that a center of the drawn glass ribbon in a width direction coincides with a center of each of the formed annular substrates in the width direction.

2. The method according to claim 1, wherein an absolute value of a difference between flatness of the glass ribbon and flatness of each annular substrate is 3 µm or less.

3. The method according to claim 2, wherein the flatness of each annular substrate is 7 µm or less.

4. The method according to claim 1, wherein the flatness of each annular substrate is 7 µm or less.

5. The method of claim 1, wherein a thickness of each annular substrate is uniform.

6. The method of claim 1, further comprising:
    polishing a top or bottom surface of each annular substrate, without grinding.

* * * * *